United States Patent [19]
Mitchell

[11] Patent Number: 5,903,879
[45] Date of Patent: May 11, 1999

[54] METHOD OF MANAGING A LOAN FOR FUNDING A PENSION

[76] Inventor: Clark Alan Mitchell, 1408 E. Chicago Cir., Chandler, Ariz. 85225-5440

[21] Appl. No.: 08/739,437

[22] Filed: Oct. 29, 1996

[51] Int. Cl.⁶ .................................................. G06F 157/00
[52] U.S. Cl. .............................. 705/38; 705/35; 705/36; 705/37; 705/39
[58] Field of Search .................... 705/35, 36, 37, 705/38, 39

[56] References Cited

U.S. PATENT DOCUMENTS

| | | | |
|---|---|---|---|
| 4,633,397 | 12/1986 | Macco | 705/30 |
| 4,648,037 | 3/1987 | Valentino | 364/408 |
| 4,742,457 | 5/1988 | Leon et al. | 705/35 |
| 4,750,121 | 6/1988 | Halley et al. | 705/35 |
| 4,774,664 | 9/1988 | Campbell et al. | 705/38 |
| 4,953,085 | 8/1990 | Atkins | 364/408 |
| 5,083,270 | 1/1992 | Gross et al. | 364/408 |
| 5,206,803 | 4/1993 | Vitagliano et al. | 364/408 |
| 5,237,500 | 8/1993 | Perg et al. | 705/35 |
| 5,429,506 | 7/1995 | Brophy et al. | 434/107 |
| 5,590,037 | 12/1996 | Ryan et al. | 705/4 |
| 5,644,726 | 7/1997 | Oppenheimer | 705/38 |
| 5,644,727 | 7/1997 | Atkins | 705/40 |
| 5,689,649 | 11/1997 | Altman et al. | 395/236 |
| 5,689,650 | 11/1997 | Mcclelland et al. | 705/36 |
| 5,742,775 | 4/1998 | King | 705/38 |
| 5,761,441 | 6/1998 | Bennett | 705/35 |
| 5,787,404 | 7/1998 | Fernandez-Holmann | 705/35 |
| 5,806,047 | 9/1998 | Hackel et al. | 705/36 |
| 5,809,484 | 9/1998 | Mottola et al. | 705/38 |

*Primary Examiner*—Allen R. MacDonald
*Assistant Examiner*—Romain Jeanty
*Attorney, Agent, or Firm*—Paul F. Wille

[57] ABSTRACT

An employee eligible to participate in a pension plan is loaned up to the full employee contribution to the plan, thereby encouraging participation in the pension plan. This "Participation Loan" includes periodic payments to the employee until employment ceases, the employee retires, or the loan terminates. Data on the Loan, the pension plan assets, the employer, and the employee is kept by the lender. The employee must provide current information to the lender to prevent termination of the loan, at which point the loaned amount, plus interest, is due. Failure to provide current information causes an alarm that can lead to termination of the Loan. At termination, the loaned amount, plus interest, is preferably re-paid in a single payment. The Participation Loan can be secured or unsecured. The secured variant can use traditional assets for collateral or an existing balance in the defined contribution pension.

8 Claims, 4 Drawing Sheets

METHOD OF MANAGING A LOAN FOR FUNDING A PENSION

BACKGROUND OF THE INVENTION

This invention relates to a data processing method for monitoring and controlling a loan that is used for the purpose of funding a defined contribution pension plan. This loan involves a financial transaction in which an asset is appreciated by lending money to contribute to the asset while using, directly or indirectly, the asset as collateral for the loan.

Many corporate employers have employee savings plans that include provisions for matching employee contributions, such as plans established in accordance with section 401(k) of the Internal Revenue Code. Presently, up to twenty percent of eligible employees do not take advantage of this benefit. Enabling these employees to borrow in order to fund their unused or under-utilized benefits provides both the employee and the lender with high returns because of the matching contributions by the employer. There is currently no financial product that adds incentive to participate in such savings plans.

In the coming years, individuals will be forced to take more responsibility for meeting the financial needs associated with retirement. The rapidly declining ratio of workers to retirees will force cutbacks in Social Security. The traditional defined benefit pension plan is also in decline due to escalating costs. Defined contribution plans, such as the 401(k), have emerged as the preferred retirement vehicle for corporate employees. This demand has resulted in a rapid increase in both the number of plans and participants.

Loans using 401(k) assets as collateral are not uncommon. Approximately seventy percent of all 401(k) plans allow installment loans. However, such loans are strictly regulated by the U.S. government, which must approve any new type of loan using pension assets as collateral. The approval process can be daunting and success is not assured. Thus, there are relatively few types of loans.

There are two types of installment loans currently available. The most common is a general purpose loan that has a maximum term of five years. There is also a residential loan that is restricted to the purchase of a primary residence and has no legal limit on term. Under the current law, one may borrow up to one-half the asset value in the defined contribution plan (up to a maximum of $50,000), with loan payments being made at least quarterly. Typically, the interest on the loan is paid back into the account of the borrower. Administrative fees are permitted.

In June 1995, the U.S. Department of Labor approved a credit card based upon 401(k) assets. This product is described in U.S. Pat. No. 5,206,803 (Vitagliano et al.). The card has a credit limit of $10,000 and the lender profits from a portion of the interest and from loan administration fees. The loan principal is entirely funded through the borrower's existing 401(k) account and a portion of the interest is returned to the borrower. This product is indicative of the maturing financial products available to defined contribution pension plans.

Most 401(k) plans allocate employee contributions into a pre-tax account. Many plans, more typically in large corporations, include the alternative of allocating contributions into an after-tax account. The assets in an after-tax account grow tax-deferred, with only the original contribution being taxed. Withdrawals from a pre-tax account are subject to stringent hardship regulations, with the exception of termination of employment. However, funds in an after-tax account may be withdrawn at any time. Some employers allocate their matching contributions to an after-tax account irrespective of the account used for an employee's contribution. The matching contribution is still tax deferred but the use of an after-tax account allows easier access to the funds. On the down side, some employers do not provide matching of after-tax contributions.

A key difference between the pre-tax and after-tax options is the effect on an employee's take-home pay. An after-tax contribution includes both the 401(k) investment and the taxes on those funds. In contrast, the only component of a pre-tax contribution is the investment capital; all taxes are deferred. Hence, the absence of taxes on pre-tax contributions reduces the employee's taxable income relative to funding the plan with after-tax monies. This translates into a smaller decrease in net income for pre-tax contributions versus after-tax contributions of the same contribution amount.

At present, all financial arrangements based on a 401(k) plan seek to use the assets of the plan without loss of tax status. None are directed to increasing the value of an asset. A line of credit for building a house is, in a sense, a loan for increasing the value of an asset. The house under construction is collateral for the loan and payments by the lender are made as necessary as various stages of construction are completed. When the house is completed, the loaned amount becomes the principal in a conventional mortgage having an amortization schedule of fixed payments.

There are many kinds of loans tailored to particular circumstances but, in general, most loans include a single, initial payment by the lender and periodic payments of a fixed amount by the borrower. Credit cards and other forms of lines of credit are somewhat more fluid but all require periodic repayment.

The cash flows of a defined contribution pension plan are typically a series of payments into the account and a single lump sum disbursement to the employee upon termination. This lump sum disbursement is often rolled over into an Individual Retirement Arrangement (IRA) account or into another employer's defined contribution plan. Hence a method that duplicates these cash flows would be ideal for funding a 401(k) plan.

Financial products that eliminate periodic repayment schedules are not uncommon. A "bullet" loan is one example of an arrangement wherein a single payment is due at the end of the loan period. The loan typically carries a very high interest rate, several points over the interest rate on a treasury bond. Similar to the bullet loan, a zero coupon bond is a common type of financial instrument that also returns only a single cash flow upon reaching term. Theoretically, a series of bullet loans or zero coupon bonds could be used to duplicate the cash flows needed to fund a pension. However, there currently exists no data processing system designed to ease the associated administrative burden.

A "reverse mortgage" provides periodic payments to the borrower and requires a single payment from the borrower at the end of the loan; e.g., as described in U.S. Pat. No. 5,083,270 (Gross et al.). The interest rate may be fixed or variable. Such loans liquidate an asset without actually selling the asset. The loan is secured by the asset and is repaid at the death of the borrower by the estate. Applying this type of loan to the funding of a pension requires a level of prescience that few lenders possess due to the variable term and adjustable disbursements. The loan also requires that the borrower be the average person described in a mortality table. The result is that assets are evaluated very conservatively, which limits the size of the loan. Thus, a reverse mortgage requires assets of significant value and is unlikely to be available to the average person.

Another type of loan is one in which the principal is not amortized, i.e., only interest payments are made. Unlike a temporary accommodation by a lender during times of financial distress, this loan is intended from its inception not to amortize principal. An arrangement known as the Home Owner's Preferred Equity (HOPE) account is such a loan. The HOPE account is described in U.S. Pat. No. 4,953,085 (Atkins) as allowing homeowners to reduce their mortgage payments by the amount attributable to principal and to apply that amount to other investments. A homeowner continues to pay interest and other charges but does not amortize the principal. This account allows the amount attributable to principal to be used to fund a pension or other investment, without requiring any immediate repayment.

A conventional mortgage requires payment of a fixed amount that is divided between principal and interest. Initially, the amount of interest is relatively high and the remainder, applied to principal, is relatively small. Near the end of the mortgage, the relationship is reversed. On average, the turnover for a home mortgage is less than four years and the principal is reduced very little. Thus, a HOPE account is not likely to provide sufficient resources for the average homeowner to fund a defined contribution pension.

Thus, at present, attempts at providing financial security, such as a 401(k) plan, are being thwarted by financial schemes that exploit the present value of an asset at the expense of the future value of that asset, making the term "financial planning" somewhat of an oxymoron. There is a need in the art to encourage savings and a 401(k) plan is an attractive vehicle for that purpose.

In view of the foregoing, it is therefore an object of the invention to provide a method for encouraging savings by persons of modest means.

Another object of the invention is to provide a method for managing accounts in which a borrower makes periodic payments from a loan into an account and the loan is not paid until the account is closed.

A further object of the invention is to provide a method for managing an account in parallel with a 401(k) plan wherein loaned amounts are applied to the plan.

SUMMARY OF THE INVENTION

The foregoing objects are achieved by this invention in which an employee eligible to participate in a pension plan is loaned up to the full employee contribution to the plan, thereby encouraging participation in the pension plan. This "Participation Loan" includes periodic payments to the employee until employment ceases, the employee retires, or the loan is terminated. Data on the Loan, the pension plan assets, the employer, and the employee is kept by the lender. The employee must provide current information to the lender to prevent termination of the loan, at which point the loaned amount, plus interest, is due. Failure to provide current information causes an alarm that can lead to termination of the Loan. At termination, the loaned amount, plus interest, is preferably re-paid in a single payment. The Participation Loan can be secured or unsecured. The secured variant can use traditional assets for collateral or an existing balance in the defined contribution pension.

The preferred embodiment of the Participation Loan is an unsecured loan. The unsecured variation is a contract between the employee-borrower and the lender. The employer's approval is not required because the employer is not a party in the contract. There exists no legal restrictions to the immediate introduction of this product. Furthermore, the lack of direct collateral makes this product available to the largest possible segment of the population with a need for funding a pension.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

The data processing for the Participation Loan preferably includes a relational database management system. A relational database enables information to be shared among the databases required by the invention. The data is organized into three databases. The first database stores information required for the account management of the borrowers. The second database contains information regarding companies or employers. The third database is used to store data concerning the pension investment funds and portfolios. In practice, the number of databases could be further segmented or combined as desired. Processing the data in accordance with the invention is straightforward. Maintaining current information within individual records requires effective administration and the invention facilitates this administration.

Figure 1:
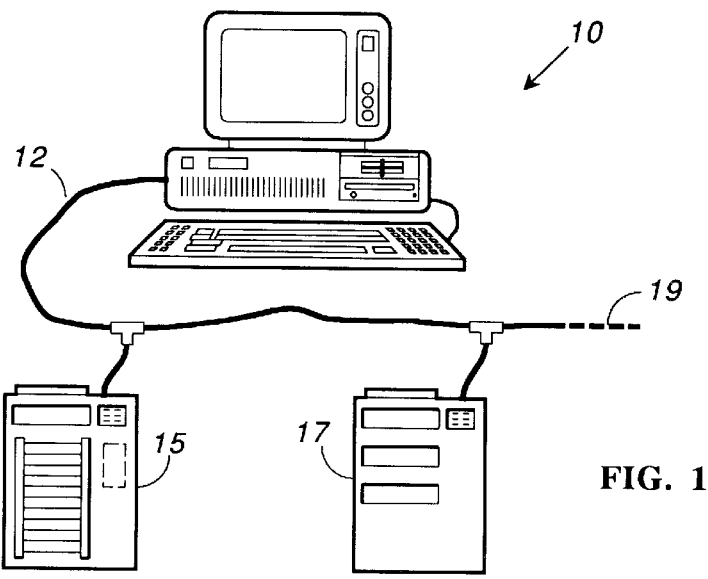
FIG. 1 illustrates the hardware for implementing the invention.

FIG. 1 illustrates the hardware for implementing the invention. Data on the employee, the loan, the employer, and the fund is entered and kept in computer terminal 10, which is a terminal (keyboard and display or monitor) or a personal computer having data processing capability. Computer terminal 10 is coupled by network 12 to printer 15 and to server 17. Server 17 contains mass data storage devices and the host computer for the network. Network 12 can be coupled other terminals, computers, printers, or to other networks, as indicated by dashed line 19.

Figure 2:
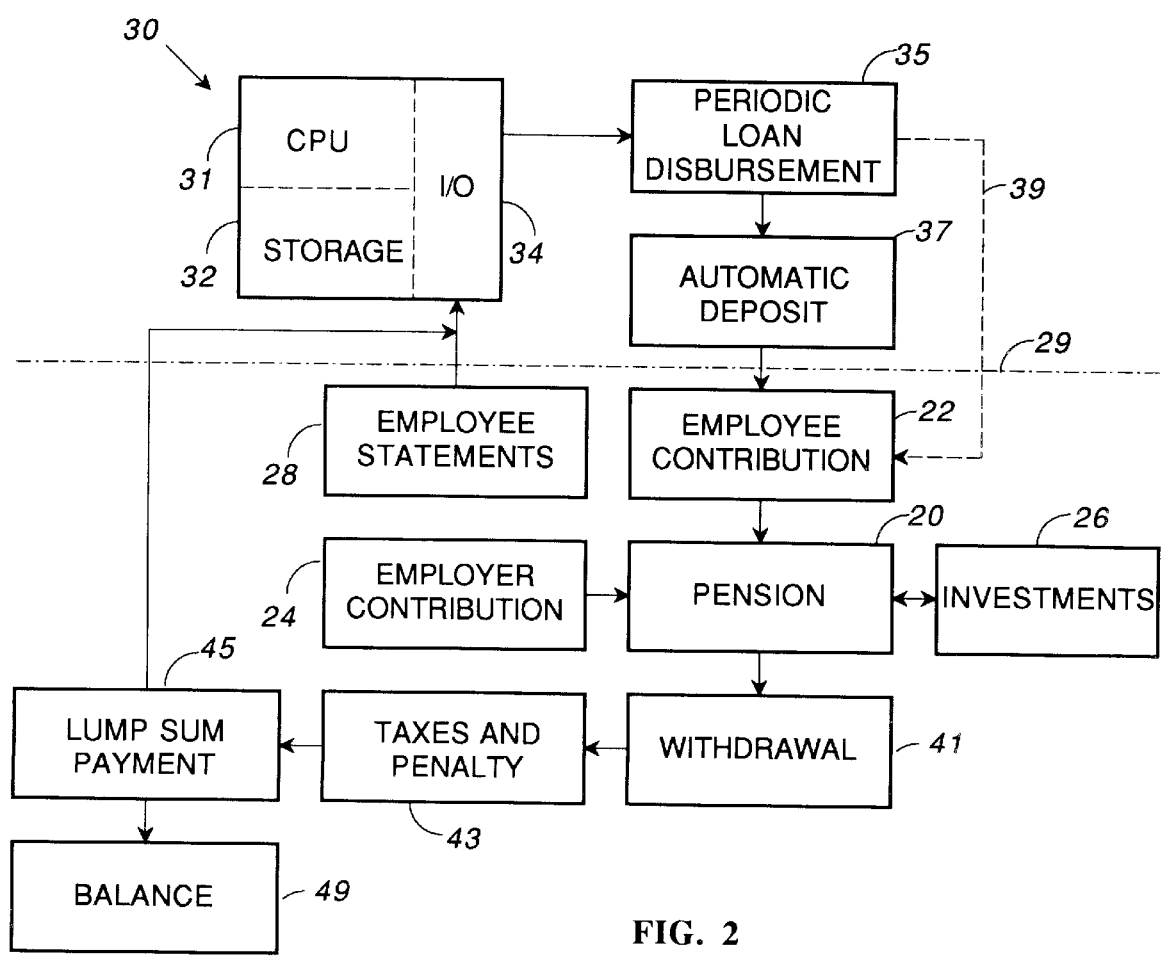
FIG. 2 illustrates the transaction flow according to the process of the invention.

FIG. 2 is a flow chart of the transactions and information in a Participation Loan. The process focuses on pension plan 20, which must exist before a loan can be made. Plan 20 is any plan including employer and employee contributions and is not restricted to a 401(k) plan but could be a 403(b) plan, a simplified 401(k) for small businesses, or a similar type of plan created to support future pension and retirement needs.

A pension account typically has three sources of income, the most significant of which is typically the employee contribution 22, which is usually made by payroll deduction. Employer matching contribution 24 is a second source of income and is usually proportional to the employee's contribution. Return on investments 26 is a third source of income for the pension account and typically includes dividends and interest. In a negative investment environment, the return on investment 20 may be negative. For a balanced portfolio with moderate risk, the three sources of income assure that the pension will grow at a rate that exceeds the interest rate on a loan. For an employee who does not participate or does not fully participate in the pension fund, the Participation Loan provides a means to participate fully in a pension fund. Full participation is defined as contributing to the extent that all the employee contributions are matched with employer contributions.

The Participation Loan is managed by system administrator 30, which includes processing unit 31 for manipulating records from storage 32 in accordance with the invention. Input/output 34 provides approval documents, disbursements, and printed statements. Assuming that a Participation Loan is in place and that all is in order with the account, system administrator 30 makes periodic loan disbursements 35 as deposits into a borrower's direct deposit account 37. This influx of capital enables the borrower to contribute to pension plan 20. Alternatively, some employers may permit direct deposit to the pension in the name of the employee, as indicated by dashed line 39. In any event, the disbursement is to be used for the employee's pension contribution and for no other purpose.

The employee provides periodic pension statements to system administrator 30 to ensure compliance with the covenants and conditions of the loan. Upon termination of employment, the Participation Loan becomes due, requiring withdrawal 41 for lump sum payment 45 to the financial institution handling the loan. Payment 45 includes the total of the periodic disbursements plus interest from the date of each disbursement. Withdrawal from a pension account is subject to taxes and, possibly, to penalties on both the federal and state level. After paying taxes and penalty 43 and lump sum payment 45, the remaining balance 49 of the withdrawal can stay in a tax sheltered account such as an IRA or a 401(k).

As schematically indicated by dot-dash line 29, the management of a Participation Loan is separate from the administration of the pension fund. In the preferred embodiment, pension account 20 is not collateral for the loan. Thus, approval of the U.S. government is not a prerequisite to this embodiment of the invention. This not only facilitates the use of the Loan but makes the Loan less expensive because the cost of obtaining approval is avoided. The borrower is contractually obliged to provide statements 28 and lump sum payment 45 but account 20 is not collateral for the Loan. As described in conjunction with FIG. 3, the administration of the Loan includes safeguards for the lender. Optionally, the Loan can be secured by other, conventional assets of the borrower.

Pension account 20 can serve as collateral for the loan in another embodiment of the invention. As with the other types of 401(k) secured loans, there would be no default risk for the financial institution because the source of the borrowed funds are the employee's own account. The financial institution servicing the loan derives profit from a portion of the interest and from administration fees. The employer must elect to provide provisions for a 401(k) asset secured loan. Additionally, approval of the U.S. government is necessary. Because all loans secured with deferred compensation assets require prior account balances, this type of loan would have fewer potential borrowers than the unsecured loan.

Figure 3:
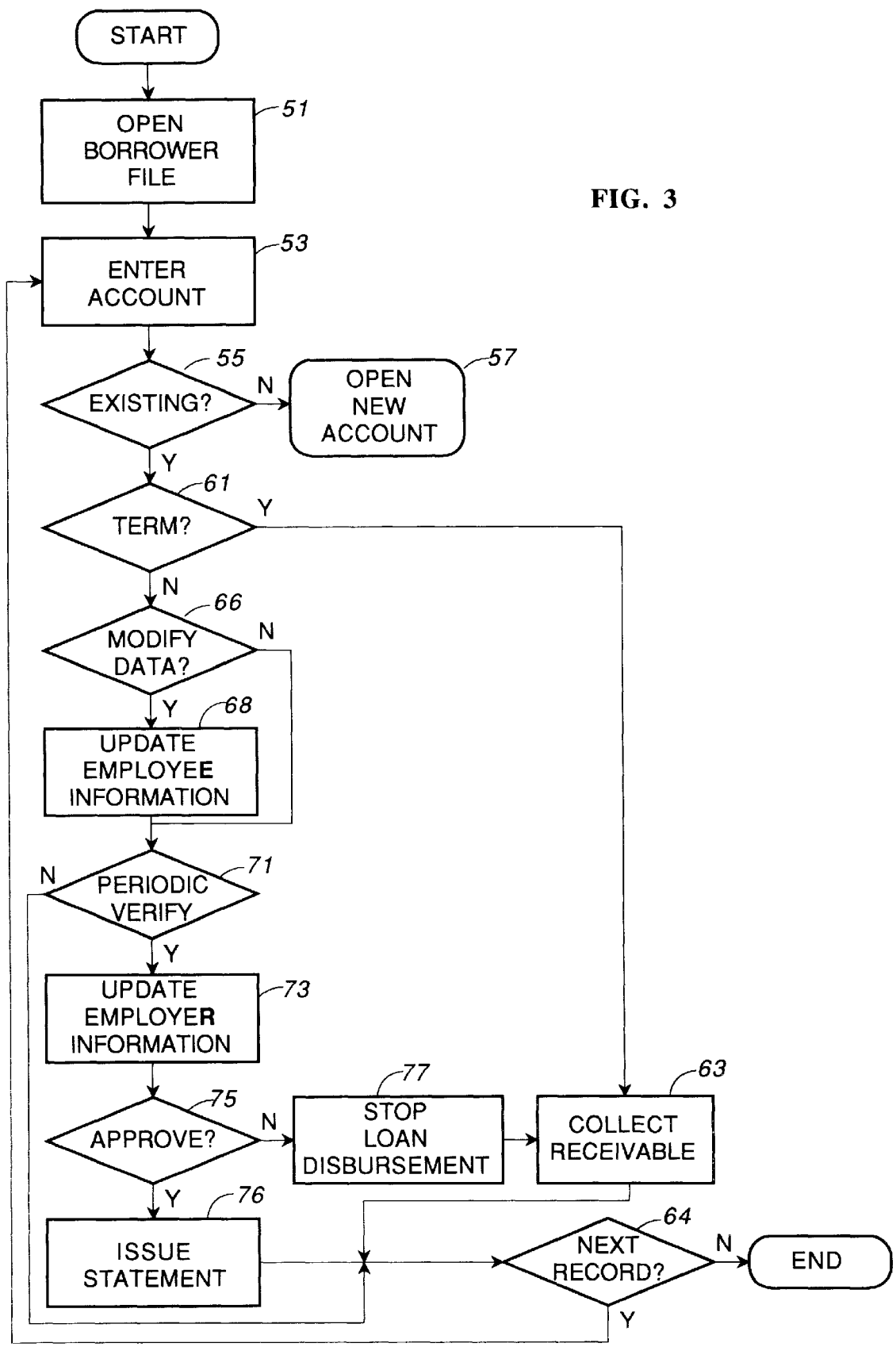
FIG. 3 is a flow chart of the processes for implementing the invention that require an operator.

FIG. 3 illustrates the operator assisted administration of Participation Loans in accordance with the invention. The process begins by opening borrower file 51 and an operator entering account number 53. The system then determines whether or not this is an existing account at 55. If not, new account procedure 57 is followed to create a new record in the database and a determination is made whether or not to make a loan. Each record requires the entry of information specific to the borrower, which includes salary, hire date, level of existing employee financed pension participation, account type, bank account numbers for direct deposit, amount of debt, tax bracket, and monthly cash flow. Other fields are then automatically calculated from the raw data, such as the amount of the periodic payment.

Data regarding the employer and the pension fund is referenced from separate databases, and is displayed in each record using read-only fields. The information on the employer includes the maximum salary deferral percentage for matching contributions, the amount of employer matching per dollar, the asset used for the employer matching, the vesting schedule, investment portfolio options, and account options. Each employer typically offers a limited number of investment portfolios to the plan participants. Therefore, the information on these funds applies to all employees of a specific employer, and includes the nature of the assets and the growth rate of each fund in the pension plan. The lender can utilize this information to recommend a pension portfolio that achieves the desired level of risk and return appropriate for both parties.

Preset criteria can be used to block approval or to alert the lender of inadequacies or inconsistencies in the data. The evaluation can include the traditional credit checks. If a Loan is approved, periodic disbursements begin in accordance with the loan agreement.

If the account is an existing account, the system proceeds with a sequence of queries to be answered by an employee of the lender. Query 61 is whether or not employment has been terminated. If yes, the system branches to collection procedure 63 that transfers the account information to a data file of accounts receivable, calculates the loan payoff, and issues the payment notification to the borrower. The system then proceeds to the next record, if desired, as indicated at query 64.

If the loan is for a fixed period terminating before the expected retirement date of the employee, query 61 also includes an internal check by the system to determine whether or not the term of the loan has expired.

Query 66 determines whether or not there has been a change in the status of the employee, e.g., a pay raise. If so, the data stored on the employee is revised, as indicated at 68. The amount invested in a defined contribution pension is traditionally expressed as a percentage of the participant's salary. Therefore, the periodic disbursements to the borrower may require adjustment to always achieve full participation in the pension plan. If there are no changes in employee status, control passes to query 71.

Query 71 determines whether an updated pension statement is available for entry. If so, the information is revised accordingly, as indicated at 73. The account statement issued by the employer includes information about the three sources of income described above. For example, the amount or percentage contributed by the employer, income from investments, the present value of the fund, the amount contributed by the employee, and traditional loans (using the plan as collateral). This information is important in the administration of the Loan and determines whether or not the periodic disbursements continue. An independent automated data processing command file is run periodically to identify clients who are delinquent in furnishing a copy of their pension statements, this program is described fully following the discussion of FIG. 3. If query 71 is negative, the system proceeds to the next record, if desired, as indicated at query 64.

Query 75 is an evaluation of the account based upon the updated information. An obvious failure would be an employee contribution less than the periodic disbursement. Other factors may not cause a failure if taken individually but cause a failure if taken in combination. The approval process depends somewhat on the risk preferences of the lending institution. Whatever the risk preference, the criteria are easily embodied in software as a series of comparisons in a tree-like decision process leading either to approval or disapproval.

The conditions regarding failure of the approval process must be fully disclosed in the covenants of the loan, and should only immediately occur in the event of fraud. All other modes of failure should allow the borrower an opportunity to correct the problem. Should the account fail the approval process, the loan disbursements are terminated at 77 and the system initiates collection procedure 63 that transfers the account information to a data file of accounts receivable, calculates the loan payoff, and issues the payment notification to the borrower. The system then proceeds to the next record, if desired, as indicated at query 64.

It is expected that each account will pass the approval process. When this happens, a logical flag (i.e., true or false) is set that allows the periodic payment to continue until the next review. A current statement of the account is then sent to the borrower, as indicated by block 76. In response to an affirmative answer at block 64, the process loop is re-entered at block 53. After the last account is processed, the borrower data file is closed and the process is exited.

Figure 4:
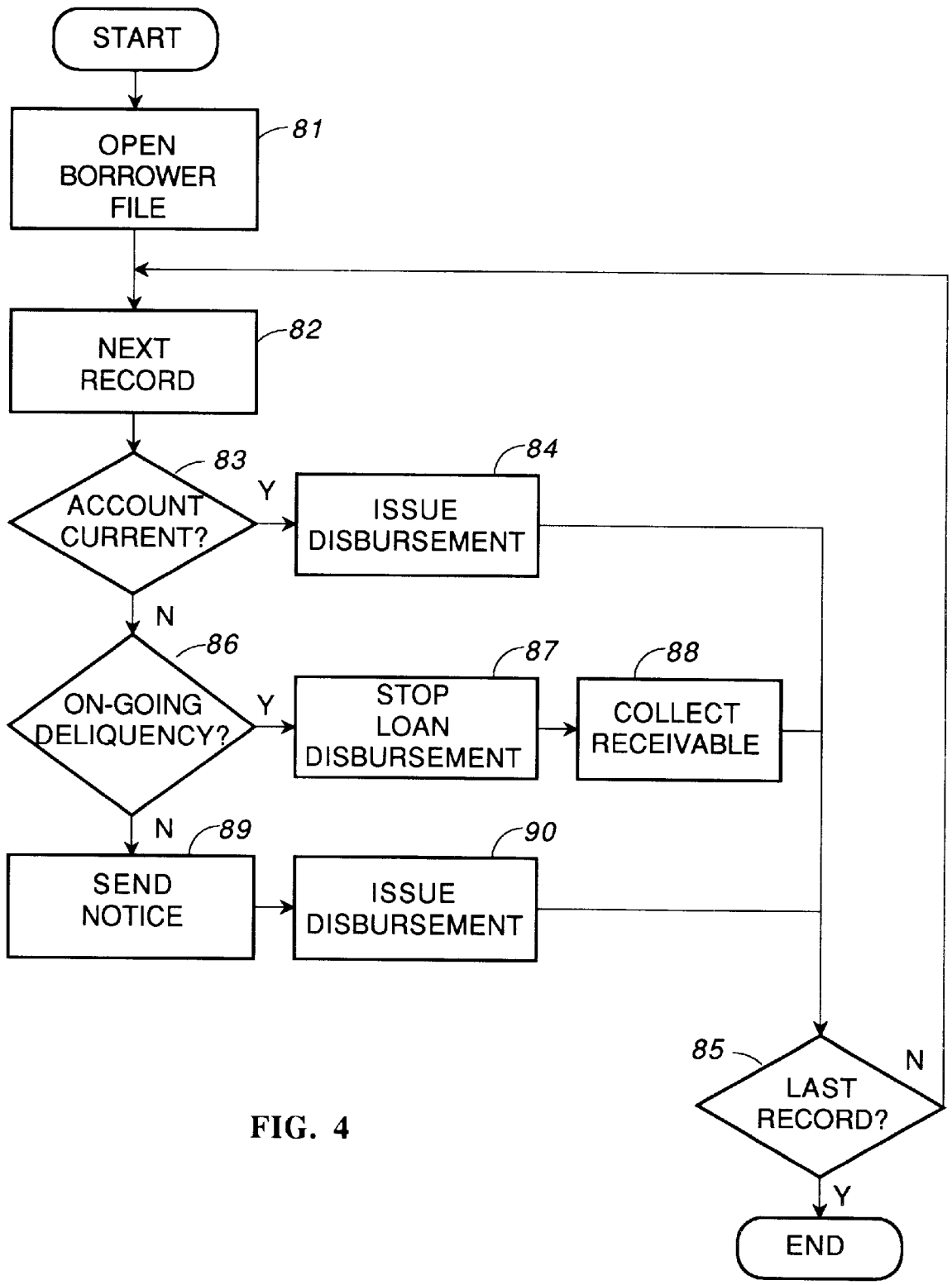
FIG. 4 is a flow chart of the automated processes for implementing the invention.

FIG. 4 illustrates the automated data processing command file that is used for loan disbursements. Additionally, the program identifies clients who are delinquent in furnishing a copy of their pension statements. This program requires no operator, and can be configured to run at specified intervals.

The program begins by opening the borrower file 81 and loading a record 82. The record is then checked at query 83 to see if the account is current, i.e., if the most recent account statement has been provided. If the response is affirmative, the system issues the appropriate disbursement 84 to the borrower, then passes control to query 85 to see if this is the last record. If not, the process loop is re-entered at 82 with the next record being opened. If the account is not current, query 83 then branches to query 86.

Query 86 determines whether a borrower remains delinquent regarding a prior request for information. If yes, the loan disbursements are terminated in 87 and the system initiates collection procedure 88. An account manager could review each account prior to issuing the receivable in order to ensure a justifiable termination. The system then loops to query 85 again to see if this is the last record. If not, the program proceeds to the next record 82.

If the response at query 86 indicates that the borrower is not delinquent (i.e., this is the first request for information or the client has had insufficient time to respond) the program proceeds to block 89 and notifies the borrower of the deficiency and the action necessary to correct it. The system issues the appropriate disbursement 90 to the borrower and passes control to query 85 to check if this is the last record. If affirmative, the borrower data file is closed and the program terminates. Additionally, this program could easily support a pro-active position by notifying clients of upcoming information requirements.

The growth rate of the pension assets affects the interest rate that a lender can charge a borrower in a Participation Loan. Plotting the borrower's net present value (NPV) of his pension account versus the loan term reveals that the relationship between the two is non-linear. Specifically, NPV gradually increases to a maximum and then decreases. This characteristic is primarily due to the loan interest rate being greater than the growth rate of the pension fund, with the interest rate being applied to an ever-increasing principal. Even with the employer's contributions added to the employee's contributions, the interest on the loan eventually overtakes the growth of the pension assets. If the pension assets grow at a rate greater than or equal to the loan interest rate, then the employee's account NPV would increase indefinitely. The greater the employer's contribution and the greater the asset growth rate, the longer it takes for the employee's NPV to reach a maximum. A loan should be terminated prior to attaining the employee's maximum NPV.

One can simulate this effect by considering an average pension plan participant and varying parameters such as the employer's contribution, the asset growth rate, the interest rate, and the loan term. There are a number of simplifying assumptions necessary in such a model. One assumption is that the pension assets grow at a constant rate. Another assumption is that interest rates will remain fixed.

The tax status of the pension contributions can also have a significant influence on the valuation of the Loan. The typical Participation Loan requires a withdrawal of tax deferred assets, which are subject to taxes and penalties. The taxes and penalties on an after-tax account are not applied to the original contribution, and are therefore substantially less than those on an equivalent pre-tax account. Furthermore, employees who have their contributions and the matching contributions in an after-tax account may opt for a distribution at any time to pay off a Loan.

Financial models used for simulating loans in accordance with the invention indicate that the after-tax account provides superior return for both the borrower and the lender in most cases. The use of pre-tax contributions allows the lender to disburse a smaller amount due to the borrower's tax shield. Hence, the size of a pre-tax account Loan is less than an after-tax account Loan.

Whether or not the loan is secured affects the interest rate and therefore the point of maximum net present value. This is simply a restatement of the basic tenet of the Capital Asset Pricing Model, which is that risk and return are proportionally related. The security may further affect the valuation of the loan because of tax consequences. If the security is the borrower's primary residence, the tax deduction for interest reduces the cost of the loan and increases NPV.

Figure 5:
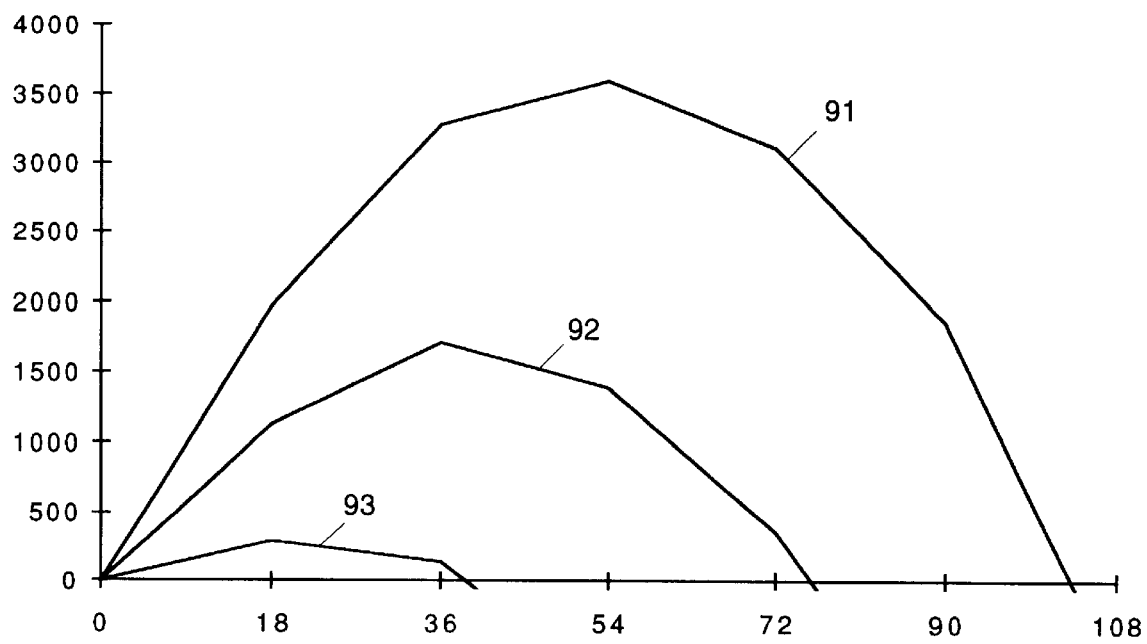
FIG. 5 is a chart of net present value of a low growth rate pension subject to a Participation Loan.
Figure 6:
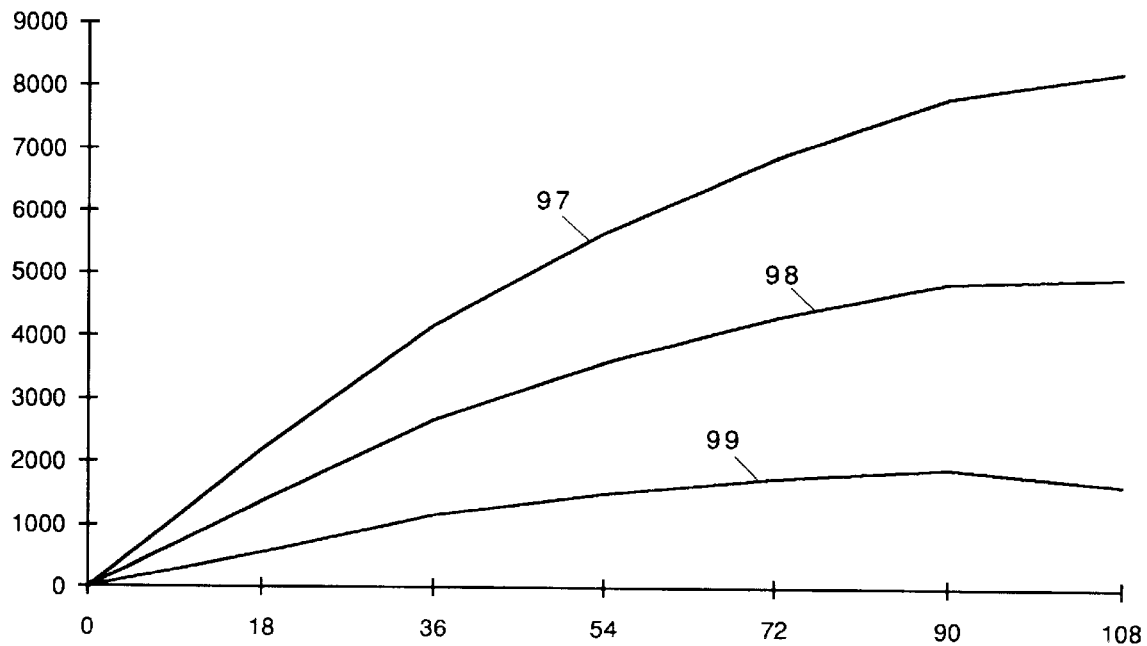
FIG. 6 is a chart of net present value of a higher growth rate pension subject to a Participation Loan.

One can overlay as many refinements as necessary or desired to satisfy the lender and the borrower that the valuation of the loan and the timing of the employee's maximum NPV is accurate. The factors most strongly affecting the valuation are the interest rate of the loan relative to the growth rate of the asset and the employer's contribution relative to the employee's contribution. FIGS. 5 and 6 illustrate the effect of these two ratios.

The data represented in FIGS. 5 and 6 is based upon an employee making $40,000 per year and contributing 6% ($200 per month) to a pre-tax account in a 401(k) plan having a zero initial balance. At withdrawal, it is assumed that the income will be taxed at the U.S. federal 1995 married filing separately rate with one exemption, and with an additional early withdrawal penalty of 10%. FIG. 5 is a chart of NPV versus loan term, assuming an asset growth rate of 4% and an interest rate of 12%. Curve 91 represents a 100% employer matching contribution ($200 per month) and peaks at fifty-one months. Curve 92 represents an employer matching contribution of 75% ($150 per month) and peaks at thirty-eight months. Curve 93 represents an employer matching contribution of 50% ($100 per month) and peaks at twenty-three months.

FIG. 6 is a chart of NPV versus loan term, assuming an asset growth rate of 12% and an interest rate of 12%. The ordinate (y-axis) is not to the same scale as in FIG. 5. Curve 97 represents a 100% employer matching contribution ($200 per month) and peaks at one hundred and twenty months. Curve 98 represents an employer matching contribution of 75% ($150 per month) and peaks at one hundred and three months. Curve 99 represents an employer matching contribution of 50% ($100 per month) and peaks at ninety-two months.

A comparison of FIG. 5 with FIG. 6 reveals the profound effect that the ratio of interest rate to asset growth rate has on loan performance. Almost as strong is the effect of the ratio of employer contribution to employee contribution. These ratios are the key factors in the evaluation of a Loan. In FIG. 3, step 75 can include a recalculation of the optimum termination date using the updated data provided by the borrower and his employer. This data is valuable because it replaces the projected asset growth rate of the pension plan with the actual growth rate.

To examine the results of FIGS. 5 and 6 in absolute terms, one needs to know the average loan term and the associated variance. This could then be applied to determine which parameters produce a feasible Participation Loan. For example, if the average loan term exceeds the NPV maximum of a particular curve, then that combination of parameters (i.e., interest rate, asset growth rate, and employer matching contribution) is definitely unacceptable.

In practice, the loan term is typically determined by the tenure and the degree that the borrower is vested in a pension plan. In many pension plans, the participant achieves full vesting upon reaching five years of service with the employer. The financial institution offering the Participation Loan must choose at what stage of vesting to allow an employee access to the loan. This decision is based upon the risk preferences of the lender. The most conservative approach would be only to lend to fully vested employees. However, providing service to employees within one year of full vesting would increase the size of the market with minimal risk. Statistics regarding employer tenure indicate the average tenure for all occupations in 1991 was 4.5 years. However, employees in certain occupations such as the farming and service sectors may not have pension benefits. The professional and managerial occupations averaged 6.0 years of employer tenure, and are more representative of the desired market. Therefore the term of the average Participation Loan should vary between one to six years, depending upon the risk preferences of the lender. For a fairly conservative level of risk, the average term would be two years.

The invention thus provides a method for encouraging savings by persons of modest means. The method permits managing accounts in which a borrower makes periodic payments from a loan into a pension fund and pays off the loan with a single withdrawal from the fund when the loan is terminated.

The invention enables one to manage an account in parallel with a 401(k) plan wherein loaned amounts are applied to the plan.

Having thus described the invention, it will be apparent to those of skill in the art that various modifications can be made within the scope of the invention. For example, the loan can be secured or unsecured and, if secured, the value of the security is tracked using the data processing of the invention. Other alternatives include restructuring the single repayment of the loan into an annuity or multiple payments of varying amount. This would be particularly useful for retirees who desire to minimize the tax burden.

What is claimed as the invention is:

1. A method for computerized management of a plurality of loans wherein each loan includes a series of payments to a borrower, the borrower invests the payments in a pension fund, and the borrower repays the loan upon termination of the loan, said method comprising the steps of:

(a) storing data on the pension fund and on the borrower in at least one database in a computer;

(b) using the computer to determine the amount of the series of payments from the data;

(c) using the computer to make at least a first of the series of payments;

(d) using the computer to compare the status of the fund with the stored data; and (e) if predetermined criteria are met then using the computer to make another payment in the series, else using the computer to provide an indication that the loan should be terminated.

2. The method as set forth in claim 1 wherein said step of continuing to make payments includes the step of using the computer to provide a statement of account including the sum of the payments made and the accrued interest, dividends, or other appreciation.

3. The method as set forth in claim 1 wherein the series of payments is made periodically.

4. The method as set forth in claim 1 wherein said determining step includes the steps of:

using the computer to estimate the date upon which the borrower achieves maximum net present value under the loan; and storing the date in the computer as a preferred termination date.

5. The method as set forth in claim 1 wherein the pension fund is operated by an employer of the borrower and one of the criteria evaluated in step (e) is continued employment.

6. The method as set forth in claim 1 wherein steps (d) and (e) are repeated periodically.

7. The method as set forth in claim 1 wherein steps (b), (c), (d), and (e) are repeated periodically.

8. The method as set forth in claim 1 wherein the computer determines the amount of each payment individually.

* * * * *